(12) United States Patent
Paul

(10) Patent No.: US 11,416,544 B2
(45) Date of Patent: Aug. 16, 2022

(54) SYSTEMS AND METHODS FOR DIGITALLY FETCHING MUSIC CONTENT

(71) Applicant: Meta Platforms, Inc., Menlo Park, CA (US)

(72) Inventor: Debashish Paul, Sunnyvale, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 348 days.

(21) Appl. No.: 16/581,812

(22) Filed: Sep. 25, 2019

(65) Prior Publication Data

US 2021/0089574 A1 Mar. 25, 2021

(51) Int. Cl.
*G06F 16/683* (2019.01)
*G06F 16/532* (2019.01)

(52) U.S. Cl.
CPC .......... *G06F 16/683* (2019.01); *G06F 16/532* (2019.01)

(58) Field of Classification Search
CPC .............................. G06F 16/683; G06F 16/532
See application file for complete search history.

(56) References Cited

U.S. PATENT DOCUMENTS

| | | |
|---|---|---|
| D392,267 S | 3/1998 | Mason et al. |
| D472,902 S | 4/2003 | Nashida et al. |
| D559,258 S | 1/2008 | Kita et al. |
| D588,151 S | 3/2009 | Okada |
| D606,080 S | 12/2009 | Murchie et al. |
| D616,463 S | 5/2010 | Barcheck et al. |
| D658,203 S | 4/2012 | Hally et al. |
| 8,572,169 B2 | 10/2013 | Partovi et al. |
| D696,269 S | 12/2013 | Hyunjung et al. |
| D713,851 S | 9/2014 | Wood |
| D715,314 S | 10/2014 | Wood |
| D716,822 S | 11/2014 | Wood |
| D723,044 S | 2/2015 | Park |
| 8,971,623 B2 | 3/2015 | Gatt et al. |
| D738,889 S | 9/2015 | Balles et al. |
| 9,171,095 B1 | 10/2015 | Bilinski et al. |
| D759,680 S | 6/2016 | Behar |
| D760,267 S | 6/2016 | Butcher et al. |
| D760,759 S | 7/2016 | Butcher et al. |
| D761,268 S | 7/2016 | Oh et al. |
| D763,904 S | 8/2016 | Knapp et al. |
| D767,622 S | 9/2016 | Lee et al. |

(Continued)

OTHER PUBLICATIONS

First Action Interview received for U.S. Appl. No. 16/555,676 dated Jun. 24, 2021, 32 pages.

(Continued)

*Primary Examiner* — Baoquoc N To
(74) *Attorney, Agent, or Firm* — FisherBroyles, LLP

(57) ABSTRACT

Systems and methods for digitally fetching music content may include (1) providing a user of a device with a music service accessible via the device, (2) receiving a digital user request to (i) select a music composition based on content from an additional music service and (ii) digitally fetch the music composition for use via the music service, and, in response to receiving the digital user request, (3) analyzing the content and selecting the music composition based on the analysis of the content, and (4) digitally fetching the music composition for use via the music service. Various other methods, systems, and computer-readable media are also disclosed.

20 Claims, 5 Drawing Sheets

(56) References Cited

U.S. PATENT DOCUMENTS

| | | |
|---|---|---|
| D770,495 S | 11/2016 | Knapp |
| D770,499 S | 11/2016 | Rodriguez |
| D770,500 S | 11/2016 | Rodriguez |
| D773,526 S | 12/2016 | Butcher et al. |
| D773,527 S | 12/2016 | Butcher et al. |
| D773,534 S | 12/2016 | Yuk et al. |
| D774,053 S | 12/2016 | Kim et al. |
| D792,445 S | 7/2017 | Sun |
| D792,453 S | 7/2017 | Butcher et al. |
| D794,663 S | 8/2017 | Sakuma |
| D803,239 S | 11/2017 | Yuk et al. |
| D814,515 S | 4/2018 | Guzman et al. |
| D819,683 S | 6/2018 | Zhang et al. |
| D829,759 S | 10/2018 | Clapper et al. |
| D831,062 S | 10/2018 | Chen |
| D831,066 S | 10/2018 | Takita et al. |
| 10,175,757 B2 | 1/2019 | Missig et al. |
| 10,270,983 B1 | 4/2019 | Van Os et al. |
| D851,111 S | 6/2019 | Dye et al. |
| D852,210 S | 6/2019 | Wei |
| D853,410 S | 7/2019 | Barnett et al. |
| 10,490,026 B2 | 11/2019 | Bryant et al. |
| D868,811 S | 12/2019 | Jeon et al. |
| 10,496,705 B1 | 12/2019 | Irani et al. |
| D874,497 S | 2/2020 | Krenkler et al. |
| D874,498 S | 2/2020 | Krenkler et al. |
| D874,499 S | 2/2020 | Krenkler et al. |
| D874,500 S | 2/2020 | Krenkler et al. |
| D877,193 S | 3/2020 | Li et al. |
| 10,623,621 B2 | 4/2020 | Li et al. |
| D889,478 S | 7/2020 | Rotgans et al. |
| D890,188 S | 7/2020 | Anno et al. |
| D892,855 S | 8/2020 | Liu |
| D895,649 S | 9/2020 | Jetly et al. |
| 10,783,320 B2 | 9/2020 | Jon et al. |
| 10,803,160 B2 | 10/2020 | Tussy |
| D900,845 S | 11/2020 | Tomori |
| D902,242 S | 11/2020 | Assaf et al. |
| 10,911,504 B1 | 2/2021 | Paul |
| 2005/0038819 A1 | 2/2005 | Hicken et al. |
| 2008/0122796 A1 | 5/2008 | Jobs et al. |
| 2009/0182736 A1 | 7/2009 | Ghatak |
| 2009/0262087 A1 | 10/2009 | Kim |
| 2009/0319356 A1 | 12/2009 | Spitzer et al. |
| 2010/0049702 A1 | 2/2010 | Martinez et al. |
| 2010/0192105 A1 | 7/2010 | Kim et al. |
| 2011/0267530 A1 | 11/2011 | Chun |
| 2012/0054666 A1 | 3/2012 | Baird-Smith et al. |
| 2012/0303711 A1 | 11/2012 | Park |
| 2012/0323938 A1 | 12/2012 | Skeen et al. |
| 2013/0031162 A1* | 1/2013 | Willis ............ H04L 65/1069 709/203 |
| 2013/0073983 A1 | 3/2013 | Rasmussen et al. |
| 2013/0182138 A1 | 7/2013 | Cho |
| 2013/0198268 A1 | 8/2013 | Hyman |
| 2013/0218721 A1 | 8/2013 | Borhan et al. |
| 2014/0007171 A1* | 1/2014 | Yang ................ G06F 16/683 725/109 |
| 2014/0031961 A1 | 1/2014 | Wansley et al. |
| 2015/0127748 A1 | 5/2015 | Buryak |
| 2015/0148106 A1 | 5/2015 | Choi et al. |
| 2015/0186454 A1 | 7/2015 | Kim |
| 2015/0264169 A1 | 9/2015 | Yim et al. |
| 2016/0034970 A1 | 2/2016 | Musil et al. |
| 2016/0205340 A1 | 7/2016 | Jang et al. |
| 2016/0226804 A1 | 8/2016 | Hampson et al. |
| 2016/0292269 A1 | 10/2016 | O'Driscoll et al. |
| 2017/0068910 A1 | 3/2017 | Burroughs |
| 2017/0109642 A1 | 4/2017 | Kawale et al. |
| 2018/0189391 A1 | 7/2018 | Ip et al. |
| 2018/0224990 A1 | 8/2018 | Shim et al. |
| 2018/0300577 A1* | 10/2018 | Kendrick ............ G06K 9/3241 |
| 2019/0050128 A1 | 2/2019 | Lee |
| 2019/0080066 A1 | 3/2019 | Van Os et al. |
| 2019/0215449 A1 | 7/2019 | Chun et al. |
| 2019/0238646 A1 | 8/2019 | Edwards et al. |
| 2020/0004495 A1 | 1/2020 | Dundar et al. |
| 2020/0042554 A1 | 2/2020 | Liu et al. |
| 2020/0089724 A1 | 3/2020 | Zimovnov et al. |
| 2020/0117340 A1 | 4/2020 | Amitay et al. |
| 2020/0241746 A1 | 7/2020 | Chen et al. |
| 2020/0267267 A1 | 8/2020 | Kim et al. |

OTHER PUBLICATIONS

Final Office Action received for U.S. Appl. No. 16/574,376 dated Jul. 15, 2021, 43 pages.

Preinterview First Office Action received for U.S. Appl. No. 16/595,267 dated Jul. 1, 2020, 35 pages.

First Action Interview received for U.S. Appl. No. 16/595,267 dated Sep. 2, 2020, 36 pages.

Preinterview First Office Action received for U.S. Appl. No. 16/574,376 dated Sep. 4, 2020, 22 pages.

Zhang et al., "Siamese Style Convolution Neural Networks for Sound Search by Vocal Imitation", IEEE/ACM Transactions on Audio, Speech, and Language Processing, vol. 27, No. 2, Sep. 3, 2018, pp. 1-13.

Spotify, "Daily Mix", URL: https://support.spolify.com/us/using_spotify/discover_music/daily-mix/, as accessed Oct. 21, 2019, pp. 1-3.

Non-Final Office Action received for U.S. Appl. No. 16/555,690 dated Jul. 9, 2020, 20 pages.

Notice of Allowance received for U.S. Appl. No. 16/555,690 dated Oct. 5, 2020, 20 pages.

Cao et al., "Systems and Methods for Feature-Based Music Selection", U.S. Appl. No. 16/574,379, filed Sep. 18, 2019, 46 pages.

Paul, Debashish, "Transient Contextual Music Streaming", U.S. Appl. No. 16/555,676, filed Aug. 29, 2019, 54 pages.

Paul, Debashish, "System and Methods for Digitally Proximity-Based Music Stations", U.S. Appl. No. 16/657,008, filed Oct. 18, 2019, 55 pages.

Non-Final Office Action received for U.S. Appl. No. 29/706,940 dated Jan. 25, 2021, 23 pages.

"QR code scanning icon stock illustration", URL: https://www.istockphoto.com/vector/qr-code-scanning-icon-gm1158288755-316352859, istockphoto.com, Jun. 26, 2019, pp. 1-3.

Non-Final Office Action received for U.S. Appl. No. 29/706,941 dated Jan. 25, 2021, 23 pages.

Hardwick, Tim, "How to Sign Up for Apple Music", URL: https://www.macrumors.com/how-to/sign-up-for-apple-music/, macrumors.com, Feb. 13, 2019, pp. 1-4.

First Action Interview received for U.S. Appl. No. 16/574,376 dated Feb. 4, 2021, 27 pages.

Final Office Action received for U.S. Appl. No. 16/595,267 dated Feb. 24, 2021, 54 pages.

Preinterview First Office Action received for U.S. Appl. No. 16/555,676 dated May 5, 2021, 49 pages.

* cited by examiner

SYSTEMS AND METHODS FOR DIGITALLY FETCHING MUSIC CONTENT

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
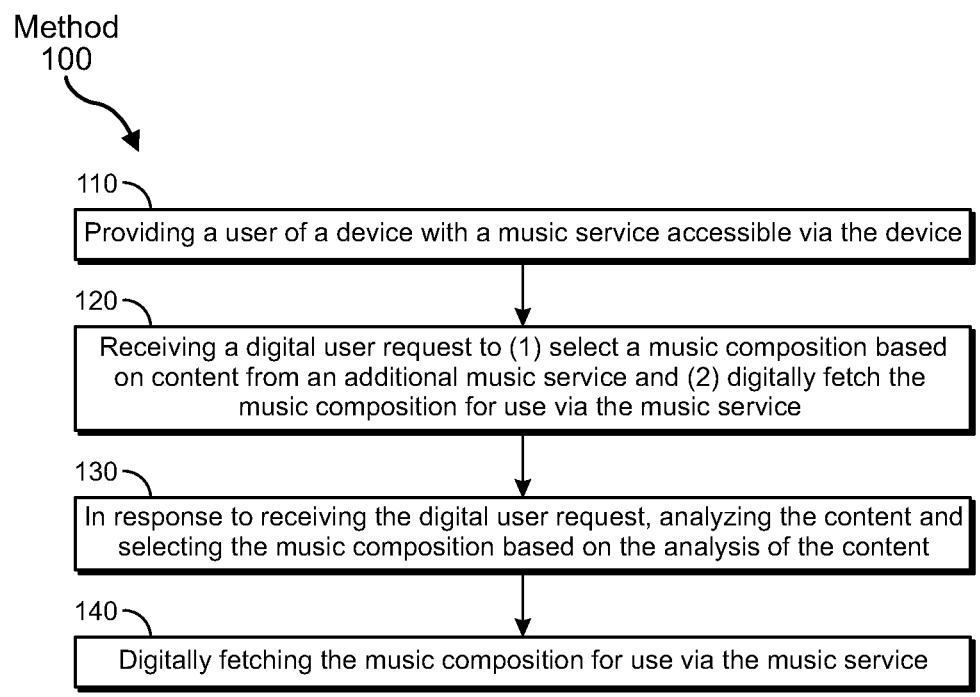
FIG. 1 is a flow diagram of an exemplary method for digitally fetching music content.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Users of computing devices may digitally obtain and listen to music content using a variety of different platforms (e.g., different music services). Often, manually transferring music content from one platform to another may be time intensive, technically difficult, and/or monetarily expensive. These costs may prohibit users from attempting to transfer music content between platforms. Responding to this, the instant disclosure identifies a need for improved systems and methods for transferring music content (e.g., from one platform to another).

As will be described in greater detail below, embodiments of the present disclosure may provide a music fetching system, operating within a music application, that adds music content to the music application for a user. In some examples, the music fetching system may identify the music content from a third-party music application. In these examples, the music fetching system may connect, via the user's device, with the third-party music application. Once connected, the user may submit user input to the third-party music application to play music content and the music fetching system may identify the music content being played. Then, the music fetching system may fetch the identified music content and/or may fetch additional music content that is selected based on the identified music content.

Additionally or alternatively, the music fetching system may fetch music based on a digital photo (e.g., a screenshot) of a music station (e.g., captured from an interface of a third-party music service). In these examples, the music fetching system may scan and identify music content within the captured music station and may fetch the identified music content and/or additional music content that is selected based on the identified music content. In one embodiment, the fetched music content may be organized into a new music station patterned after the captured music station.

In some examples, the music fetching system may fetch music based on a digital photo (e.g., a screenshot) of album art. In these examples, the music fetching system may scan the digital photo and may identify music content to add to the music application based on the results of the scan. In some embodiments, the music content may be added to the music application for music-consumption purposes. Additionally or alternatively, the music content may be added to the music application for digital social sharing purposes.

As will be explained in greater detail below, embodiments of the present disclosure may improve systems for digitally transferring music content from one music service and/or medium to another. The present disclosure may improve the functioning of a computer itself by improving data transfer of music content.

The following will provide, with reference to FIG. 1, detailed descriptions of computer-implemented methods for digitally fetching music content. Detailed descriptions of corresponding example systems will also be provided in connection with FIG. 2. Additionally, detailed descriptions of corresponding exemplary interfaces will be provided in connection with FIGS. 3-5.

FIG. 1 is a flow diagram of an exemplary computer-implemented method 100 for digitally fetching music content. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 and/or modules operating in a user device 204 (e.g., as shown in exemplary system 200 in FIG. 2).

Server 202 generally represents any type or form of backend computing device that may perform one or more functions directed at digitally fetching music for users of a music service. In some examples, server 202 may perform music functions in conjunction with a social media platform 206 that provides a music service to its users. Although illustrated as a single entity in FIG. 2, server 202 may include and/or represent a group of multiple servers that operate in conjunction with one another.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, a user 208 of user device 204 may be a user of a music service operating in conjunction with server 202. In examples in which this music service is provided by social media platform 206, user 208 may be a member of social media platform 206 and user device 204 may have installed an instance of a social media application that operates as part of the social media platform 206, through which the music service is accessible. Additionally or alternatively, user device 204 may have installed a browser that may navigate to one or more webpages maintained by social media platform 206.

Social media platform 206 may provide a variety of services (e.g., in addition to a music service) for the users within its network (e.g., user 208). In one example, social media platform 206 may provide a newsfeed service. The term "newsfeed" may generally refer to any type or form of social media consumption channel that presents a scrollable collection of newsfeed compositions. In some examples, a newsfeed may scroll (e.g., upward or downward) to reveal different compositions within the newsfeed, in response to receiving user scrolling input. In one example, the scrollable collection may include a collection of newsfeed compositions created by contacts of a particular user (e.g., friends of the particular user). The term "newsfeed composition" as used herein generally refers to any type or form of composition that may be displayed in a newsfeed. Newsfeed compositions may include, without limitation, text-based compositions, media-based compositions (which may include either a single media item or a collage of multiple media items), and/or a link to an online article.

As another example, social media platform 206 may provide a digital story service. The digital story service may provide users with a story consumption channel, which presents a continuous series of digital story compositions to a story-consumer, one by one. In one example, the story consumption channel may transition from presenting one digital story composition to the next automatically, without requiring any user input to do so. In some examples, a digital story composition may only be viewable for a predetermined amount of time. For example, a digital story composition may be set to disappear after twenty-four hours. The term "digital story composition" may generally refer to any type or form of social media composition intended for a story consumption channel. A digital story composition may include a variety of content (e.g., a digital photograph, a graphic, text, a digital video and/or a digital recording of a music composition). In some examples, digital story compositions from a same source (e.g., created and/or posted by a same user) may be grouped together within the story consumption channel, such that each digital story composition from a particular source is displayed prior to displaying digital story compositions from another source.

As another example, social media platform 206 may provide a messaging service. The term "messaging service" may generally refer to any type or form of digital message delivery system that enables users of social media platform 206 to exchange messages (e.g., private messages between two or more users). These messages may include a variety of content (e.g., a text, link, live video, voice recordings, etc.) and may take a variety of forms (e.g., e-mail, text message, group chat, etc.).

Figure 2:
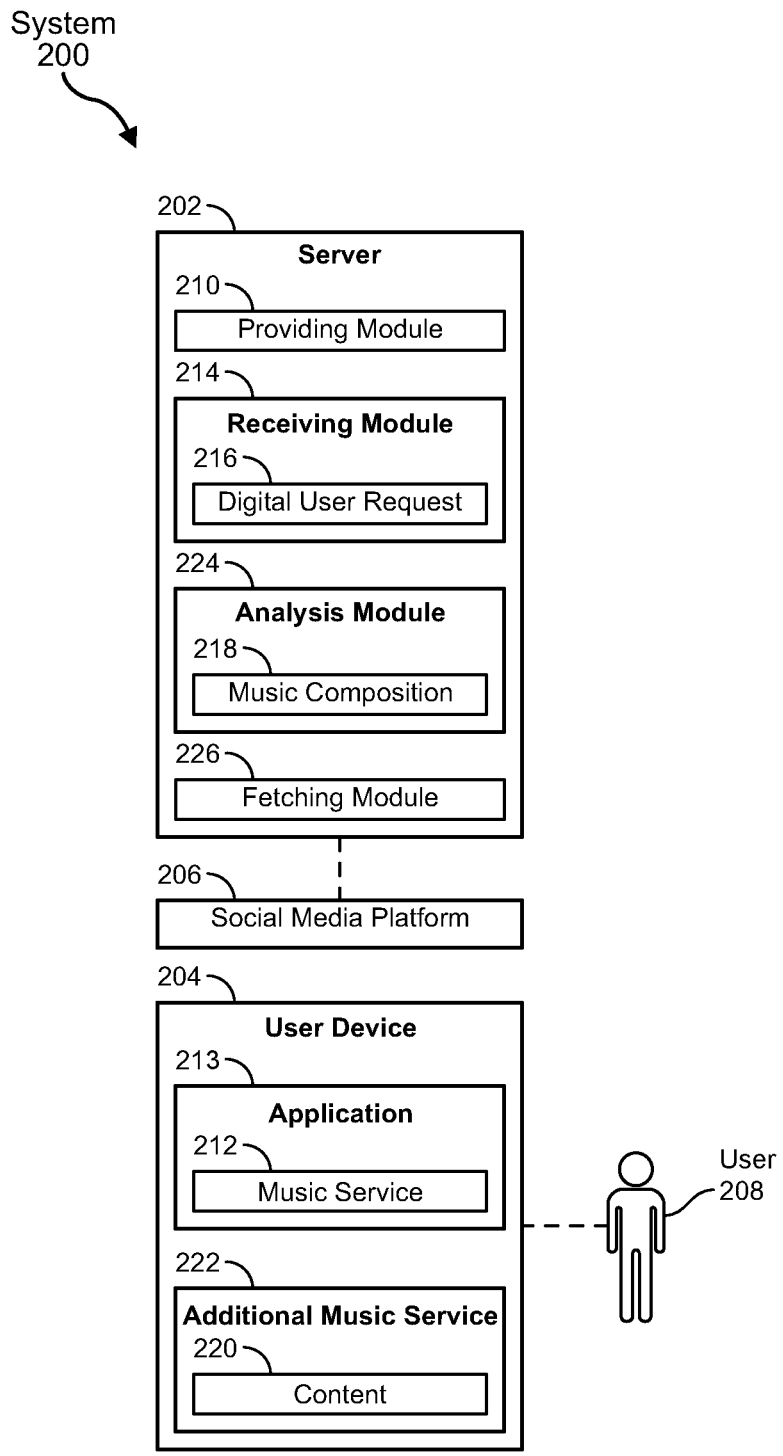
FIG. 2 is a block diagram of an exemplary system for digitally fetching music content.

Returning to FIG. 1, at step 110, one or more of the systems described herein may provide a user of a device with a music service. For example, as illustrated in FIG. 2, a providing module 210 may provide user 208 of user device 204 with a music service 212. In some examples, music service 212 may be accessible via an application 213 (e.g., a social media application and/or a music application) installed on user device 204.

The term "music service" may generally refer to any type or form of service that enables user 208 to consume and/or share music compositions via user device 204. In some examples, music service 212 may digitally stream music to user device 204. Additionally or alternatively, music service 212 may allow music to be digitally downloaded to user device 204.

Music service 212 may provide music in a variety of ways. In one example, music service 212 may provide music in response to a direct user request. For example, music service 212 may receive a user request for a particular music composition and may play the requested music composition in response to receiving the request. In another example, music service 212 may create and/or maintain one or more music stations for user 208.

The term "music station" may refer to any type or form of digital container that stores a queue of music compositions that may be played via a music player provided by music service 212. In some examples, the queue may represent an evolving queue and music compositions may continually be added to the queue in real time (e.g., as the music compositions within the queue are being played). In other examples, the queue may represent a designated (e.g., static) set of music compositions (e.g., a playlist). In some examples, the queue may be filled with music compositions that correspond to a particular genre of music and/or that relate to a common theme. Music compositions may be manually added to a music station via user input, may be automatically added (e.g., based on deduced user preferences), or a combination.

In some examples, as discussed above, user 208 may be a member of social media platform 206 and music service 212 may be provided as part of social media platform 206 (e.g., as part of a social media application installed on user device 204). Music service 212 may operate within social media platform 206 in a variety of ways. In one embodiment, music service 212 may operate as a passive layer that operates in the background of another service provided by social media platform 206 and/or as a supplemental feature of another service provided by social media platform 206.

For example, music service 212 may operate as a passive layer within a digital story service and/or a newsfeed service. As a specific example, a composition interface that enables user 208 to create a digital story and/or a newsfeed composition may include a selectable element that enables user 208 to add music to the digital story and/or newsfeed composition. In another example, music service 212 may operate as a passive layer within a messenger service. In this example, a messenger interface that enables user 208 to create private messages may include a selectable element that enables user 208 to share music in the private message. As illustrated in each of these examples, providing music service 212 as a passive layer within social media platform 206 may enable the social sharing of music.

In addition, or as an alternative, to operating as a passive layer within social media platform 206, music service 212 may operate as part of an active layer within social media platform 206 (e.g., within an active layer interface or set of active-layer interfaces dedicated to music consumption and/or sharing). The active layer interface may represent any type or form of interface dedicated to music consumption and/or sharing. In some examples, the active layer interface may represent a player interface corresponding to a music player. In one such example, the player interface may include a sharing element that enables a user to digitally share music with other users of music service 212 and/or social media platform 206.

Returning to FIG. 1, at step 120, one or more of the systems described herein may receive a digital user request to (1) select a music composition based on content from an additional music service and (2) digitally fetch the music composition for use via the music service. For example, as illustrated in FIG. 2, a receiving module 214 may receive a digital user request 216 to (1) select a music composition 218 based on content 220 from an additional music service 222 and (2) digitally fetch music composition 218 for use via music service 212.

Content 220 may generally refer to any type or form of digital content that may be analyzed by a computing system and used as the basis for selecting a music composition. In some examples, content 220 may represent a digital image. In one such example, content 220 may represent a screenshot. The term "screenshot" may generally refer to any type or form of digital image of visual content displayed within (and digitally captured from) a display element of a visual output device (e.g., a user device with a display screen such as user device 204). In examples in which content 220 represents a screenshot, user 208 may have submitted a screenshot command (e.g., by selecting a selectable screenshot element and/or pressing a PrtScr key) while the desired visual content (i.e., content 220) is being displayed via a display element of user device 204. In related examples, content 220 may represent a digital image captured via a digital camera of user device 204 and/or digitally uploaded to user device 204.

Figure 3:
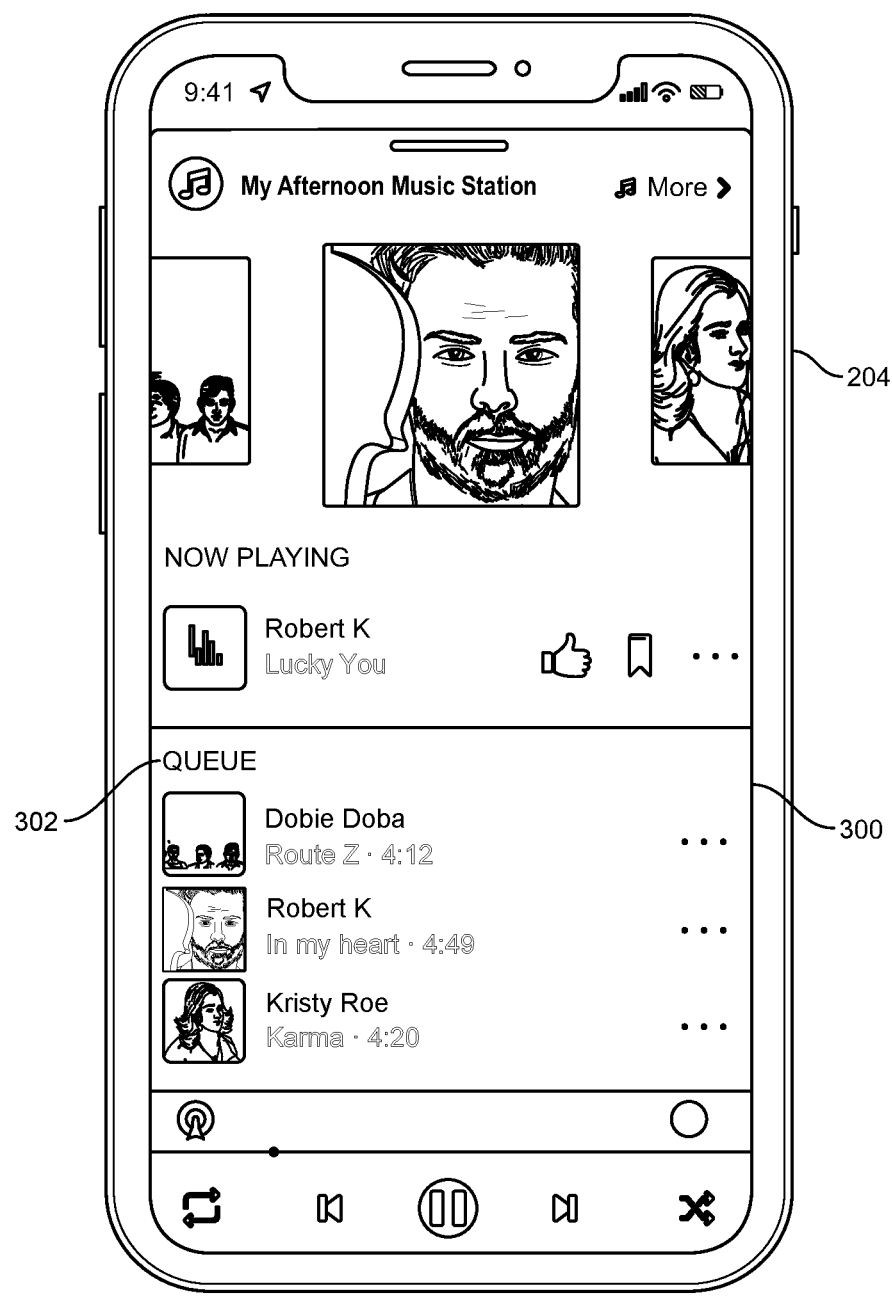
FIG. 3 is an illustration of an exemplary music station interface.

Content 220 may represent a digital image of a variety of different types of visual content. In some examples, content 220 may represent a digital image of a queue of one or more music compositions within a music station provided by additional music service 222. In one such example, the digital image may represent a digital image of an interface displaying the queue. FIG. 3 provides a specific example of an interface 300 displaying a queue 302 of music compositions within a music station (i.e., "My Afternoon Music Station"), which may represent content that may be included within a digital image (e.g., within a screenshot). Additionally or alternatively, content 220 may represent a digital image of visual content relating to an album, such as album art (e.g., cover art), an artist or musical group (e.g., promotional images), and/or information relating to an album, artist, and/or musical group (e.g., a digital image of an informational poster).

Figure 4:
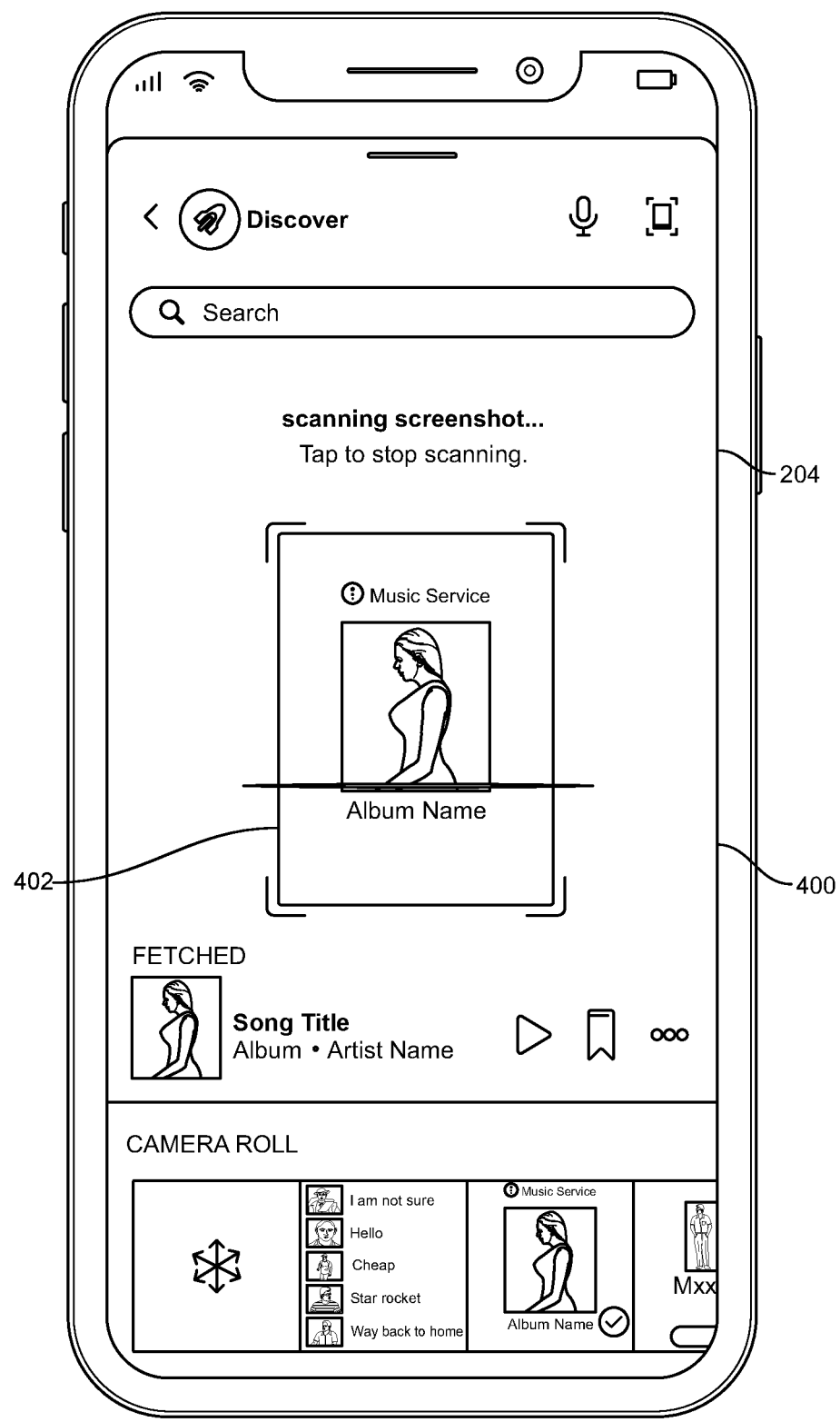
FIG. 4 is an illustration of an exemplary image scanning interface.

In examples in which content 220 represents a digital image, user 208 may submit the digital image to a scanning interface operating in conjunction with receiving module 214 (e.g., by uploading the digital image and/or initiating the creation of a screenshot while the scanning interface is open and/or using a screenshot element provided within the scanning interface). Then, receiving module 214 may receive digital user request 216 by receiving the digital image submitted by user 208 to the scanning interface. FIG. 4 provides an illustration of an exemplary image scanning interface 400 configured to receive a digital image (such as a digital image 402 of an album cover).

In some embodiments, content 220 may represent an audio segment of a music composition (e.g., an audio segment of music composition 218 and/or of an additional music composition used as a basis for selecting music composition 218). In these examples, receiving module 214 may receive the audio segment in a variety of ways. In some examples, user 208 may have uploaded an audio file including the audio segment and receiving module 214 may receive the uploaded audio file via user input. Additionally or alternatively, receiving module 214 may present a sound printing (e.g., audio-capture) interface (e.g., via a display element of user device 204) and may receive the audio segment via the sound printing interface.

In these embodiments, receiving module 214 may capture an audio segment that is being played (e.g., via a media player) while the sound printing interface is open and/or while a capture element provided within the sound printing interface is selected. In some examples, a player module may play the audio segment in response to an additional music service (e.g., additional music service 222) receiving user input to play the audio segment. In other examples, the player module may play the audio segment in response to the sounding printing interface receiving user input to (i) access the additional music service and (ii) play the audio segment via the additional music service. In another embodiment, the audio segment may be played by an outside source (i.e., external to user device 204) that may be captured by a microphone of user device 204.

Figure 5:
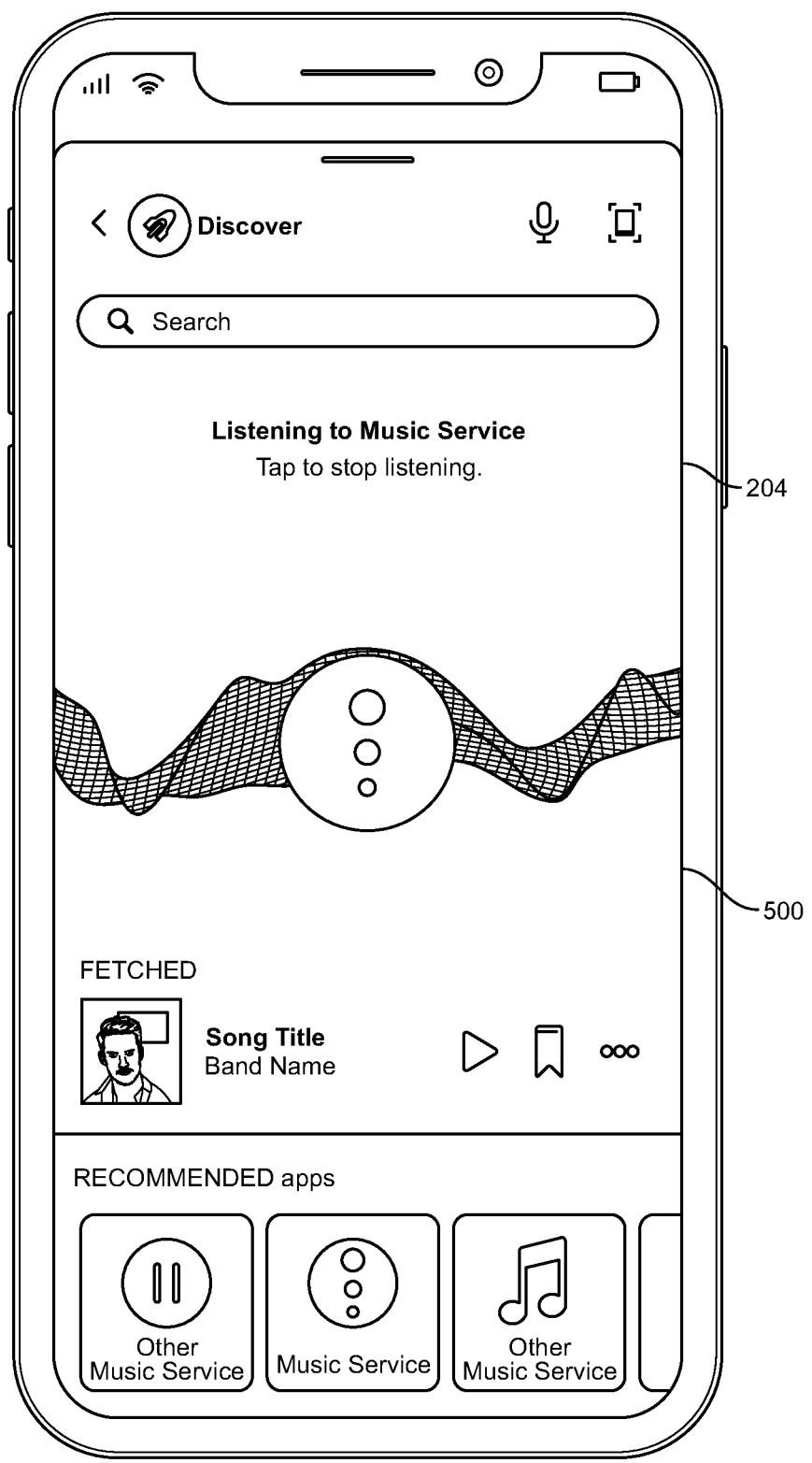
FIG. 5 is an illustration of an exemplary audio segment scanning interface.

FIG. 5 depicts a specific example of a sound printing interface 500 that may digitally capture an audio segment being played while sound printing interface 500 is open. As illustrated in FIG. 5, in some examples, a sound printing interface presented by receiving module 214 may include a variety of selectable elements, each of which may correspond to a different additional music service. In these examples, receiving module 214 may, in response to receiving user input selecting one of the selectable elements, connect with the corresponding additional music service and capture an audio segment from the corresponding music service.

In some such examples, receiving module 214 may be configured to receive a specific music composition selected by user 208 from the corresponding additional music service (e.g., a specific music composition affirmatively selected by user 208). In other examples, receiving module 214 may be configured to receive (1) a random subset of music stored for user 208 by the additional music service, (2) a designated subset of music stored for user 208 by the additional music service (e.g., music content corresponding to a particular music station) and/or (3) all the music stored for user 28 by the additional music service.

Returning to FIG. 1, at step 130, in response to receiving the digital user request, one or more of the systems described herein may analyze the content and select the music composition based on the analysis of the content. For example, an analysis module 224 may analyze content 220 and select music composition 218 based on the analysis of content 220.

Analysis module 224 may analyze content 220 (i.e., to select music composition 218) in a variety of ways, depending on the form that content 220 takes. In examples in which content 220 represents a digital image (e.g., a screenshot) of an interface depicting a queue of music compositions (e.g., within a music station provided by an additional music station), analysis module 224 may analyze content 220 by (1) scanning the digital image and (2) identifying music composition 218 within the digital image as a result of the scanning. In these examples, analysis module 224 may scan the digital image using any type or form of text and/or image analyzing technique. Then, analysis module 224 may select music composition 218 in response to identifying the music composition within the digital image. Using FIG. 3 as a specific example, analysis module 224 may (1) scan a digital image of interface 300, (2) identify, as a result of the scanning, that the music composition "In my heart" is included within queue 302, and (3) select the music composition "In my heart" in response to identifying the music composition "In my heart" in queue 302.

In additional or alternative examples in which content 220 represents a digital image of an interface, analysis module 224 may (1) scan the digital image, (2) identify an additional music composition within the digital image, and (3) determine that music composition 218 is similar to the additional music composition according to a similarity metric. Then, analysis module 224 may select music composition 218 in response to the determination that music composition 218 is similar to the additional music composition identified within the digital image.

Analysis module 224 may determine that music composition 218 is similar to an additional music composition in a variety of ways. In some examples, analysis module 224 may determine that the music compositions have a feature in common (e.g., a common musical feature such as a common tempo, a common genre, a common artist, a common category of artist, a common lyric, etc.). Additionally or alternatively, analysis module 224 may determine that users that are interested in the additional music composition are also interested in music composition 218. For example, in one embodiment, analysis module 224 may determine that the music compositions are similar because they are co-located in more than a threshold number of user music stations (e.g., playlists). In some examples, analysis module 224 may rely on machine learning to determine that the music compositions are similar.

Next, in examples in which content 220 represents an audio segment, analysis module 224 may analyze content 220 by (1) analyzing the audio segment and (2) as a result of the analysis, determining that the audio segment is a segment of music composition 218. Analysis module 224 may analyze audio segments using any type or form of audio analysis technique. In one embodiment, the audio analysis technique may involve music identification based on identified features of an audio segment (e.g., a tempo, a combination and/or order of pitches, a lyric, etc.). In some examples, the audio analysis technique may rely on machine learning. Then, analysis module 224 may select music composition 218 in response to determining that the audio segment is a segment of music composition 218.

In additional or alternative examples in which content 220 represents an audio segment, analysis module 224 may analyze content 220 by (1) analyzing the audio segment, (2) as a result of the analysis, determining that the audio segment is a segment of an additional music composition, and (3) determining that music composition 218 is similar to the additional music composition according to a similarity metric. Then, analysis module 224 may select music composition 218 in response to the determination that music composition 218 is similar to the additional music composition.

In examples in which content 220 represents a digital image corresponding to an album (e.g., album art), analysis module 224 may scan the digital image and determine that the digital image corresponds to a particular album. Analysis module 224 may identify the album corresponding to the digital image using any type or form of image recognition analysis. In one embodiment, analysis module 224 may rely on an image matching algorithm (e.g., to match the image to a known image of an album cover). In some examples, analysis module 224 may rely on machine learning to perform the image recognition analysis. FIG. 4 illustrates a digital image 402 of an interface depicting an album cover being scanned by analysis module 224.

Once the digital image's corresponding album is identified, analysis module 224 may identify a queue of music compositions within the corresponding album. Then, analysis module 224 may select music composition 218 in response to identifying music composition 218 within the identified queue of music compositions. In related examples, analysis module 224 may select music composition 218 in response to determining that music composition 218 is similar to an additional music composition identified within the identified queue of music compositions.

Returning to FIG. 1, after selecting the music composition, one or more of the systems described herein may digitally fetch the music composition for use via the music service (step 140). For example, as shown in FIG. 2, a fetching module 226 may digitally fetch music composition 218 (e.g., from a database maintained by server 202 and/or which server 202 has permissions to access) for use via music service 212.

Fetching module 226 may digitally fetch music composition 218 in a variety of ways. In some examples, fetching module 226 may download music composition 218 to user device 204's memory. Additionally or alternatively, fetching module 226 may stream music composition 218 (e.g., using a broadband connection). Upon fetching music composition 218, fetching module 226 may perform a variety of additional functions such as playing music composition 218 for user 208's consumption, adding music composition 218 to a music station for user 208's consumption, and/or enabling user 208 to digitally share music composition 218.

In some examples, fetching module 226 may be configured to create a music station that mirrors a music station maintained by additional music service 222. In these examples, music composition 218 may represent one of a set of music compositions to be included in the music station and analysis module 224 may have identified and selected each music composition within the set of music compositions. Then, fetching module 226 may add music composition 218, along with each of the other music compositions from the set of music compositions, to the music station that mirrors the music station maintained by additional music service 222.

As described throughout the present disclosure, the disclosed systems and methods may provide systems and methods for digitally fetching music compositions. In one example, a computer-implemented method may include (1) providing a user of a device with a music service accessible via the device, (2) receiving a digital user request to (i) select a music composition based on content from an additional music service and (ii) digitally fetch the music composition for use via the music service, and, in response to receiving the digital user request, (3) analyzing the content and selecting the music composition based on the analysis of the content, and (4) digitally fetching the music composition for use via the music service.

In some examples, the music service may operate as part of a social media platform. In some embodiments, the music service may enable the user to consume music compositions via the device and/or share music compositions via the device. In these embodiments, upon digitally fetching the music composition, the method may further include playing the music composition for the user's consumption, adding the music composition to a music station (e.g., a static queue and/or evolving ephemeral queue of music compositions) for the user's consumption, and/or enabling the user to digitally share the music composition.

In one embodiment, the content may represent a digital image of an interface displaying a queue of one or more music compositions within a music station provided by the additional music service. In this embodiment, (1) analyzing the content may include scanning the screenshot and identifying the music composition within the digital image as a result of the scanning, and (2) selecting the music composition may include selecting the music composition in response to identifying the music composition within the digital image. Additionally or alternatively, (1) analyzing the content may include (i) scanning the digital image, (ii) identifying an additional music composition within the digital image as a result of the scanning, and (iii) determining that the music composition is similar to the additional music composition according to a similarity metric, and (2) selecting the music composition may include selecting the music composition in response to determining that the music composition is similar to the additional music composition.

In one embodiment, the content may represent audio-based sample segment of the music composition. In this embodiment, (1) analyzing the content may include analyzing the audio-based sample segment and, as a result of the analysis, determining that the audio-based sample segment is a segment of the music composition, and (2) selecting the music composition may include selecting the music composition in response to determining that the audio-based sample segment is a segment of the music composition. Additionally or alternatively, (1) analyzing the content may include (i) analyzing the audio-based sample segment, (ii) as a result of the analysis, determining that the audio-based sample segment is a segment of an additional music composition, and (iii) determining that the music composition is similar to the additional music composition according to a similarity metric, and (2) selecting the music composition may include selecting the music composition in response to determining that the music composition is similar to the additional music composition.

In one embodiment, the content may represent a digital image of album art. In this embodiment, (1) analyzing the content may include scanning the digital image and identifying a queue of music compositions within an album corresponding to the album art, and (2) selecting the music composition may include selecting the music composition in response to identifying the music composition within the queue of music compositions. Additionally or alternatively, (1) analyzing the content may include scanning the digital image and identifying a queue of music compositions within an album corresponding to the album art and (2) selecting the music composition may include selecting the music composition in response to determining that the music composition is similar to one or more of the music compositions within the queue according to a similarity metric.

In one example, a corresponding system for implementing the above-described method may include (1) a providing module, stored in memory, that provides a user of a device with a music service accessible via the device, (2) a receiving module, stored in memory, that receives a digital user request to (i) select a music composition based on content from an additional music service and (ii) digitally fetch the music composition for use via the music service, and, in response to receiving the digital user request, (3) an analysis module, stored in memory, that analyzes the content and selects the music composition based on the analysis of the content, (4) a fetching module, stored in memory, that digitally fetches the music composition for use via the music service, and (5) a physical processor configured to execute the providing module, the receiving module, the analysis module, and the fetching module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) provide a user of a device with a music service accessible via the device, (2) receive a digital user request to (i) select a music composition based on content from an additional music service and (ii) digitally fetch the music composition for use via the music service, and, in response to receiving the digital user request, (3) analyze the content and select the music composition based on the analysis of the content, and (4) digitally fetch the music composition for use via the music service.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   providing a user of a device with a music service accessible via the device;
   receiving a digital user request to (1) select a music composition based on content from an additional music service, the content comprising an audio-based sample segment, and (2) digitally fetch the music composition for use via the music service;
   in response to receiving the digital user request:
       analyzing the audio-based sample segment and determining, as a result of the analysis, that (1) the audio-based sample segment is a segment of the music composition or (2) the audio-based sample segment is a segment of an additional music composition that is similar to the music composition according to a similarity metric;
       selecting the music composition in response to determining that (1) the audio-based sample segment is a segment of the music composition or (2) the audio-based sample segment is a segment of the additional music composition that is similar to the music composition according to the similarity metric; and
       digitally fetching the music composition for use via the music service.

2. The computer-implemented method of claim 1, wherein the music service operates as part of a social media platform.

3. The computer-implemented method of claim 1, wherein the music service enables the user to at least one of:
   consume music compositions via the device; or
   share music compositions via the device.

4. The computer-implemented method of claim 3, wherein, upon digitally fetching the music composition, the method further comprises at least one of:
   playing the music composition for the user's consumption;
   adding the music composition to a music station for the user's consumption; or
   enabling the user to digitally share the music composition.

5. The computer-implemented method of claim 4, wherein the music station comprises at least one of:
   a static queue of music compositions; or
   an evolving ephemeral queue of music compositions.

6. The computer-implemented method of claim 1, wherein the music service is accessible via at least one of a social media application or a music application installed on the device.

7. The computer-implemented method of claim 1, wherein the music service operates as a passive layer within at least one or a digital story service, a digital messenger service, or a digital newsfeed service.

8. The computer-implemented method of claim 7, wherein:
   the music service operates as a passive layer within the digital messenger service; and
   a messenger interface that enables the user to create private messages comprises a selectable element that enables the user to share music, via the music service, in a private message.

9. The computer-implemented method of claim 1, wherein receiving the digital user request comprises (1) presenting a sound printing interface and (2) receiving the audio-based sample segment via the sound printing interface.

10. The computer-implemented method of claim 9, wherein receiving the audio-based sample segment via the sound printing interface comprises capturing an audio segment, comprising the audio-based sample segment, that is being played via a media player while at least one of the sound printing interface is open or a capture element provided within the sound printing interface is selected.

11. The computer-implemented method of claim 10, wherein the media player plays the audio segment in response to the additional music service receiving user input to play the audio segment.

12. The computer-implemented method of claim 10, wherein the media player plays the audio segment in response to the sound printing interface receiving user input to (1) access the additional music service and (2) play the audio segment via the additional music service.

13. The computer-implemented method of claim 9, wherein receiving the audio-based sample segment via the sound printing interface comprises capturing an audio segment being played by a source external to the device via a microphone of the device.

14. The computer-implemented method of claim 9, wherein the sound printing interface comprises a plurality of selectable elements, each corresponding to a different additional music service.

15. The computer-implemented method of claim 1, wherein digitally fetching the music composition for use via the music service comprises digitally fetching the music composition as part of (1) digitally fetching a random subset of music stored for the user by the additional music service, (2) digitally fetching a designated subset of music stored for the user by the additional music service, or (3) digitally fetching all of the music stored for the user by the additional music service.

16. A system comprising:
- a providing module, stored in memory, that provides a user of a device with a music service accessible via the device;
- a receiving module, stored in memory, that receives a digital user request to (1) select a music composition based on content from an additional music service, the content comprising an audio-based sample segment, and (2) digitally fetch the music composition for use via the music service;
- an analysis module, stored in memory, that, in response to the receiving module receiving the digital user request, (1) analyzes the audio-based sample segment and determines, as a result of the analysis, that (i) the audio-based sample segment is a segment of the music composition or (ii) the audio-based sample segment is a segment of an additional music composition that is similar to the music composition according to a similarity metric and (2) selects the music composition in response to determining that (i) the audio-based sample segment is a segment of the music composition or (ii) the audio-based sample segment is a segment of the additional music composition that is similar to the music composition according to the similarity metric;
- a fetching module, stored in memory, that digitally fetches the music composition for use via the music service; and
- at least one physical processor configured to execute the providing module, the receiving module, the analysis module, and the fetching module.

17. The system of claim 16, wherein the music service operates as part of a social media platform.

18. The system of claim 16, wherein the music service enables the user to at least one of:
- consume music compositions via the device; or
- share music compositions via the device.

19. The system of claim 16, wherein the music service is accessible via at least one of a social media application or a music application installed on the device.

20. A non-transitory computer-readable medium comprising one or more computer-readable instructions that, when executed by at least one processor of a computing device, cause the computing device to:
- provide a user of a device with a music service accessible via the device;
- receive a digital user request to (1) select a music composition based on content from an additional music service, the content comprising an audio-based sample segment, and (2) digitally fetch the music composition for use via the music service;
- in response to receiving the digital user request:
  - analyze the audio-based sample segment and determining, as a result of the analysis, that (1) the audio-based sample segment is a segment of the music composition or (2) the audio-based sample segment is a segment of an additional music composition that is similar to the music composition according to a similarity metric;
  - select the music composition in response to determining that (1) the audio-based sample segment is a segment of the music composition or (2) the audio-based sample segment is a segment of the additional music composition that is similar to the music composition according to the similarity metric; and
  - digitally fetch the music composition for use via the music service.

* * * * *